United States Patent
Wang

(10) Patent No.: US 10,050,897 B2
(45) Date of Patent: Aug. 14, 2018

(54) CONTROL METHOD AND TOPOLOGY NETWORK STRUCTURE FOR TRANSMITTING PACKET

(71) Applicant: ACCTON TECHNOLOGY CORPORATION, Hsinchu (TW)

(72) Inventor: Ran-Yih Wang, Taipei (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 15/455,141

(22) Filed: Mar. 10, 2017

(65) Prior Publication Data

US 2017/0331754 A1    Nov. 16, 2017

(30) Foreign Application Priority Data

May 16, 2016    (TW) .............................. 105115073 A

(51) Int. Cl.
  *H04L 12/823* (2013.01)
  *H04L 12/26* (2006.01)
  *H04L 12/741* (2013.01)

(52) U.S. Cl.
  CPC .......... *H04L 47/32* (2013.01); *H04L 43/0882* (2013.01); *H04L 43/0888* (2013.01); *H04L 45/74* (2013.01)

(58) Field of Classification Search
  None
  See application file for complete search history.

(56) References Cited

U.S. PATENT DOCUMENTS

| | | | | |
|---|---|---|---|---|
| 6,925,056 | B1 * | 8/2005 | Lee | H04L 47/10 370/230 |
| 2008/0228936 | A1 * | 9/2008 | Schmid | H04H 20/82 709/232 |
| 2013/0044691 | A1 * | 2/2013 | Stanwood | H04W 28/24 370/328 |
| 2017/0373953 | A1 * | 12/2017 | George | H04L 43/04 |

* cited by examiner

*Primary Examiner* — Anh Ngoc M Nguyen
(74) *Attorney, Agent, or Firm* — CKC & Partners Co., Ltd.

(57) ABSTRACT

A control method, suitable for a network structure including several nodes, is disclosed. Each of the nodes is directly or indirectly electrically coupled with other nodes. The control method includes following steps. At least one packet is received by one of the nodes. The one of the nodes determines whether the received packet is originally transmitted from the node itself or other nodes. The one of the nodes drops the received packet if the received packet is originally transmitted from the same node itself. The one of the nodes selectively saves the packet according to a throughput capacity and a time interval if the received packet is originally transmitted from the other nodes.

12 Claims, 4 Drawing Sheets

S120

S121

Matches the address of packet with the address of the access control list table

S122

Distinguishes whether the address of packet matches the column of the same node in the access control list table

Fig. 1B

CONTROL METHOD AND TOPOLOGY NETWORK STRUCTURE FOR TRANSMITTING PACKET

RELATED APPLICATION

This application claims the priority benefit of TAIWAN Application serial no. 105115073, filed May 16, 2016, the full disclosure of which is incorporated herein by reference.

FIELD OF INVENTION

The invention relates to a control method and network structure. More particularly, the invention relates to a control method and network structure for decreasing the probability of repeatedly receiving the same packet.

BACKGROUND

Currently the common ways for transmitting packets can be divided into unicast, multicast or broadcast. For multicast system, packets have to be transmitted to all needed nodes, such as distributed topology connection status to each node. Traditionally, the method of flooding is usually used to forward the packets to all needed nodes.

When executing the forwarding method of flooding, it is not only possible to receive more than two same packets at the same node, but also possible to receive the packets transmitted from the node itself. Thus the waste of bandwidth and resources of central processing unit is caused. In software-defined networking (SDN), the controller needs to collect all information that is transmitted by each node, calculate the results, and then transmit the results to each node. However, transmitting information back and forth is very inefficient since it is time-consuming and it wastes the computing resources.

SUMMARY

An embodiment of this disclosure is to provide a control method, suitable for a network structure including several nodes. Each of the nodes is directly or indirectly electrically coupled with other nodes. The control method includes the following steps: At least one packet is received by one of the nodes. The node determines whether the received packet is originally transmitted from the node itself or other nodes. The node drops the received packet if the received packet is originally transmitted from the same node itself. The node selectively saves the packet according to a throughput capacity and a time interval if the received packet is originally transmitted from the other nodes.

Another embodiment of the disclosure is to provide a network structure including several nodes. Each of the nodes is directly or indirectly electrically coupled with other nodes. One of the nodes received at least one packet. The node determines whether the received packet is originally transmitted from the node itself or other nodes. The node drops the received packet if the received packet is originally transmitted from the same node itself. The node selectively saves the packet according to a throughput capacity and a time interval if the received packet is originally transmitted from the other nodes.

In summary, the disclosure is to determine the origin of the received packets on each node, and decide whether the received packets should be dropped or not. That could help to reduce the handling of duplicate packets, decrease bandwidth waste, and economize the use of arithmetic unit resources.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 1B is a flow diagram illustrating procedure according to the control method in FIG. 1A.

DETAILED DESCRIPTION

Figure 1A:
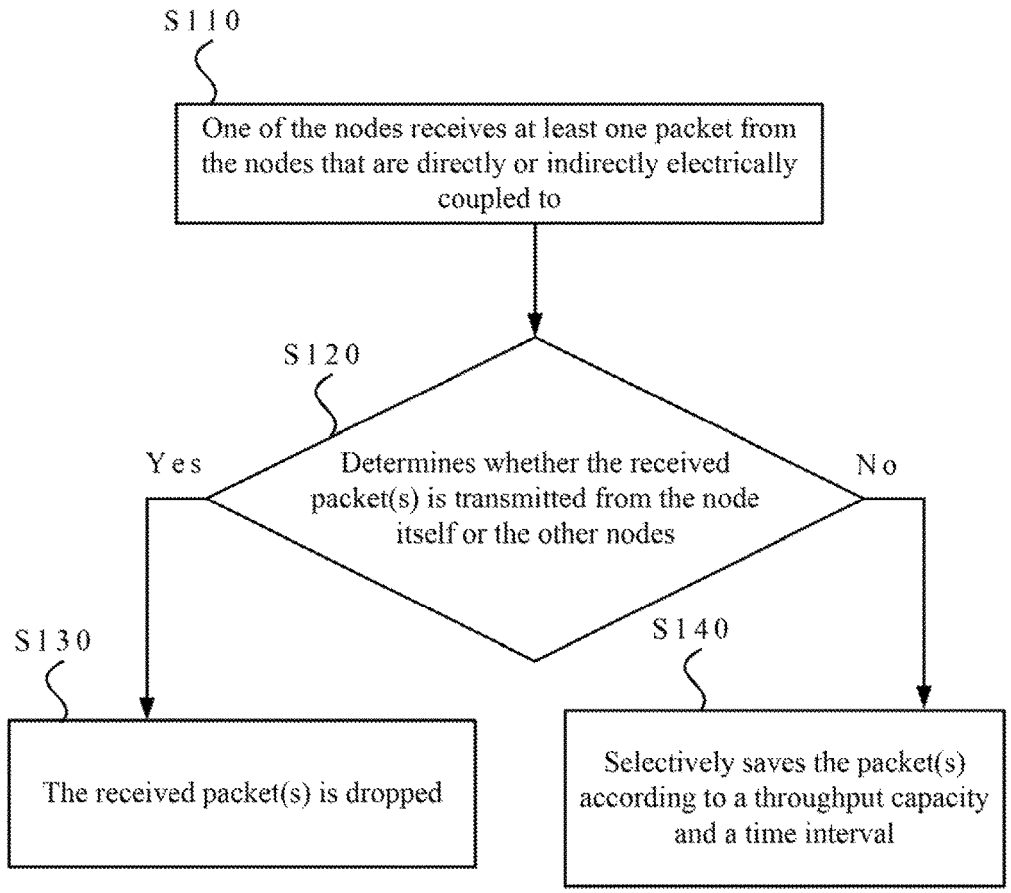
FIG. 1A is a flow diagram illustrating a control method according to some embodiments of the disclosure.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention.

In this document, the term "coupled" may also be termed as "electrically coupled", and the term "connected" may be termed as "electrically connected". "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Figure 2:
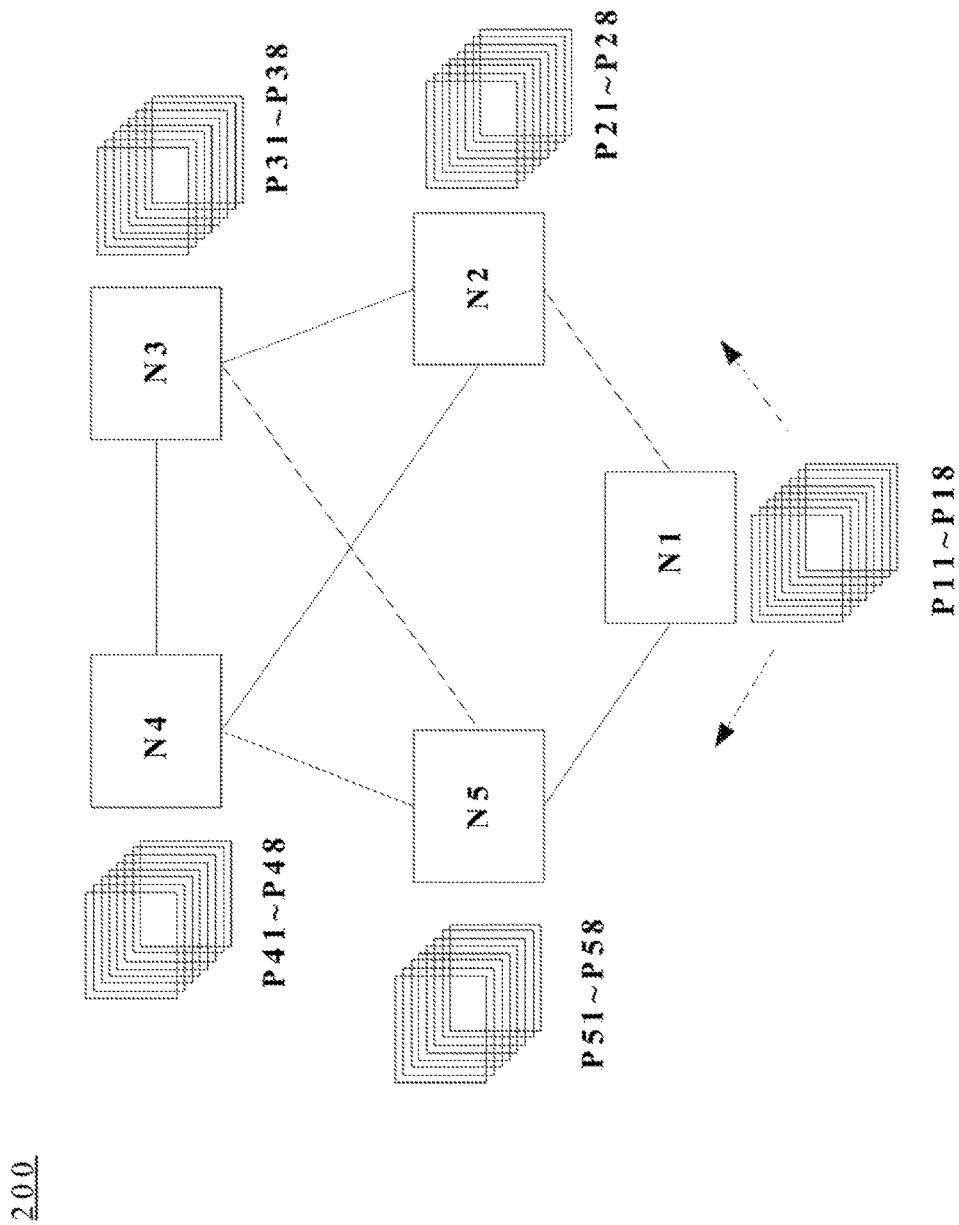
FIG. 2 is a network structure diagram illustrating the network structure according to some embodiments of the disclosure.

Reference is made to FIG. 1A and FIG. 2. FIG. 1A is a flow diagram illustrating a control method 100 according to some embodiments of the disclosure. FIG. 2 is a network structure diagram illustrating the network structure 200 according to some embodiments of the disclosure. In some of the embodiments, the network structure 200 can be topology network structure and can transmit packets of network connection status by network structures such as unicast, multicast or broadcast. The disclosure is not limited to the aforementioned network structures. The control method 100 in FIG. 1A can be applied to the network structure 200 in FIG. 2. The control method 100 includes procedure S110-S140.

Reference is made to FIG. 2, the network structure 200 includes nodes N1-N5. To be reminded that in practical application, network structure 200 may include more or less nodes, and nodes N1-N5 may include more elements. For example, there may be 3 nodes, 7 nodes, or any other numbers of nodes; nodes N1-N5 may include arithmetic unit, storage unit, etc., the arithmetic unit is used for executing commands, and the storage unit is used for storing packets. For the convenience of explanation, only nodes N1-N5 are shown on network structure 200, but in reality network structure 200 is not limited to these. Each of the nodes from N1-N5 is directly or indirectly electrically coupled to other nodes. Reference is made to FIG. 2, for node N1, node N2 and node N5 are directly coupled to node N1; node N3 and node N4 are indirectly coupled to node N1. Here indirectly coupled means when node N1 transmits packets, node N1 can transmit packets to node N2 or node N5, which is directly electrically coupled to node N1, and then transmits the packets to node N3 or node N4 through node N2 or node N5. Therefore, node N1 is directly or indirectly coupled to other nodes N2-N5. For node N2, node N1, node N3 and node N4 are directly electrically coupled, and node N5 is indirectly coupled. Here indirectly coupled means when node N2 transmits packets, node N2 can transmits packets to node N1, node N3 or node N4, which is directly electrically coupled to node N2, and then transmits the packets to node N5 through node N1, node N3 or node N4, therefore, node N1 is directly or indirectly coupled to other nodes N1, N3-N5. Similarly, following the forehead mentions, nodes N3-N5 also directly or indirectly electrically coupled to other nodes.

As shown in FIG. 1A, in the procedure S100 of the control method 100, each nodes N1-N5 transmits packets separately to other nodes that are directly or indirectly coupled.

In the embodiment, each of the nodes N1-N5 generates 8 packets, wherein Pij stands for the j-th packet generated by the Ni-th node, that is, the first to eighth packets generated by node N1 are P11-P18, node N2 generates P21-P28, node N3 generates P31-P38, node N4 generates P41-P48 and node N5 generates PSI-P58. In case that FIG. 2 would not become too messy, only packets P11-P18 generated from node N1 are shown. Packet P11 means the first packet generated by node N1. Packet P18 means the eighth packet generates by node N1. In the embodiment, the types of packets generated by nodes N1-N5 are control packets. Control packets may also comprise control commands. In some other embodiments, the types of packets generated by nodes N1-N5 may be message packets, data packets or any other kinds of packets that comprise messages or data. Furthermore, as aforementioned, in practical application the number of nodes can be arbitrary, here the number of packets that nodes N1-N5 generated are not limited to eight, the number of packets can be arbitrary as well. Also, the number of packets generated by each nodes N1-N5 can be different; the number of packets generated is not limited to be the same.

Therefore, in procedure S100, each of the nodes N1-N5 transmits 8 packets outwards, as shown in FIG. 2. For node N1, packets P11-P18 would be transmitted to node N2, and packets P11-P18 would also be transmitted to node N5 at the same time. And then, packets P11-P18 can be transmitted to node N3 and node N4 through node N2 and node N5. As a result, all of the packets generated by each nodes N1-N5 can be transmitted to all of the nodes in network structure 200.

As shown in FIG. 1A, in the procedure S110 of the control method 100, one of the nodes received at least one packet from the nodes that are directly or indirectly electrically coupled to. For example, node N1 receives packets from each node. The received at least one packet from node N1 can be control packet, message packet or data packet that transmitted or sent by Node N2-N5 using the method of flooding. That is to say, the packets received by node N1 may include packets P21-P28, P31-P38, P41-P48 or PSI-P58 which originally transmitted from other nodes N2-N5 or packets P11-P18 that originally transmitted from node N1 itself. Packets P11-P18 transmitted by node N1 in procedure S100 may return to the same node N1 again due to flooding forwarding. Similarly, node N2 receives packets from each node, which may also contain packets P11-P18, P31-P38, P41-P48 or P51-P58 that originally transmitted from other nodes N1 and N3-N5. The other nodes N2-N5 may be deduced by analogy.

And then, in procedure S120, one of the nodes determines whether the received packet(s) is transmitted from the node itself or the other nodes. In procedure S130, if the received packet(s) is transmitted from the same node itself, then the received packet(s) is dropped. In procedure S140, if the received packet is transmitted from the other nodes, then the packet is selectively saved according to a throughput capacity and a time interval.

Through procedure S120, procedure S130 and procedure S140, each of the nodes can determine how to deal with the received packets.

For example, in procedure S120, one of the nodes can determine whether to throw the packet away or not by distinguishing the origin address of the received packet. Assume that each of the packets P11-P18 transmitted from node N1 corresponds to address M11-M18; each of the packets P21-P28 transmitted from node N2 corresponds to address M21-M28; on the analogy of this, each of the packets P51-P58 transmitted from node N5 corresponds to address M51-M58. For example, if node N1 receives a packet which has the same address of N1 (e.g. return to node N1 after several times of transition), that is, if the address is M11-M18, then procedure S130 is executed, and node N1 would drop the packet. If the packet received by N1 has address other than M11-M18, that is, any one of M21-M58, then procedure S140 is executed.

To avoid nodes N1-N5 repeatedly receiving and dealing with the same packet in a period of time, in procedure S140, each of the nodes determines whether the throughput of the received packet exceeds the throughput capacity in the time interval. Here the time interval can be set to be a suitable length of time, such as 1 millisecond (ms), 10 milliseconds or 1 second. The throughput capacity of the packet can be set to be a size of a packet (e.g., 128 bytes, it depends on the standardized size of unit packet between nodes).

Assume that node N1 received packet P32, since the address M32 of packet P32 shows that the packet is not transmitted from the same node N1, than node N1 would further distinguish in procedure S140, whether the throughput of received packet P32 exceeds 128 bytes. If the throughput of received packet P32 does exceed 128 bytes, it means that node N1 has received the same or similar packet P32 in a short period of time, so the received packet P32 can be dropped by node N1 to avoid the same packet be received or dealt with repeatedly.

Furthermore, in some of the embodiments, each of the nodes N1-N5 has access control list table (ACL). The access control list table comprises the address M11-M58 of each packet P11-P58 transmitted from each nodes N1-N5. Each nodes N1-N5 can coordinate with the access control list table to execute the aforementioned procedure S120, S130 and S140, but the disclosure is not limited thereto. In some other embodiments, each of the nodes N1-N5 can execute the aforementioned procedure S120, S130 and S140 by the processor, processing circuit, communication control circuit and storage module of each nodes N1-N5.

Take node N1 for example, the execution of access control list table can be as Table 1 in the following:

TABLE 1

| Address | Throughput | Time Interval | Execution |
|---------|-----------|---------------|-----------|
| M11-M18 | | ANY | drop |
| M21-M28 | >128 bytes | <1 ms | drop |
| M21-M28 | ELSE | | keep |
| M31-M38 | >128 bytes | <1 ms | drop |
| M31-M38 | ELSE | | keep |
| M41-M48 | >128 bytes | <1 ms | drop |
| M41-M48 | ELSE | | keep |
| M51-M58 | >128 bytes | <1 ms | drop |
| M51-M58 | ELSE | | keep |

Reference is made to FIG. 1B. FIG. 1B is a flow diagram illustrating procedure S120 according to the control method 100 in FIG. 1A. In the embodiment, take node N1 for example, procedure S120 further comprises procedure S121 and procedure S122. Procedure S121 matches the address of packet with the address of the access control list table (e.g. the access control list table of node N1 shown in Table 1). Then, procedure S122 distinguishes whether the address of packet matches the column of the same node in the access control list table.

In detail, in the embodiment, the address of the packet is IP address, the address of packets P11-P18, P21-P28, P31-P38, P41-P48 and P51-P58 can be shown as M11-M11, M21-M28, M31-M38, M41-M48 and M51-M58. Therefore, all of the packets comprise the address respectively. The address M11-M18 all occur from node N1 and correspond to the first packet P11 to the eighth packet P18 generated by node N1 respectively. In the embodiment, packet P11-P18 has different address M11-M18 separately. Address M11 means the first packet P11 originally generated by node N1; address M12 means the second packet P12 originally generated by node N1; on the analogy of this, for example, address M35 means the fifth packet P35 originally generated by node N3.

For example, in some other embodiments, the address of the packet may comprises the MAC address of node N1-N5 respectively.

According to the access control list table as shown in Table 1, For node N1, the execution according to address M11-M18 is drop, which means that when node N1 receives a packet with address within M11-M18, node N1 would drop the received packet. In the embodiment, dropping the packet means neither deal with the received packet furthermore nor transmits the received packet to other nodes. Therefore, in the transmit method of flooding, node N1 would not transmit the packet P11-P18 originally sent from node N1 itself repeatedly.

On the other hand, take node N2 for example, the implement of the access control list table may be as Table 2 in the following:

TABLE 2

| Address | Throughput | Time Interval | Execution |
|---------|-----------|---------------|-----------|
| M11-M18 | >128 bytes | <1 ms | drop |
| M11-M18 | ELSE | | keep |
| M21-M28 | | ANY | drop |
| M31-M38 | >128 bytes | <1 ms | drop |
| M31-M38 | ELSE | | keep |
| M41-M48 | >128 bytes | <1 ms | drop |
| M41-M48 | ELSE | | keep |
| M51-M58 | >128 bytes | <1 ms | drop |
| M51-M58 | ELSE | | keep |

According to the access control list table as shown in Table 2, for node N2, the execution according to address M21-M28 is drop, which means that when node N2 receives a packet with address within M21-M28, node N2 would drop the packet. In the embodiment, dropping the packet means neither deal with the received packet furthermore nor transmits the received packet to other nodes.

Furthermore, when the address of the packet that node N1 receives is not transmitted from the same node N1 itself but from other nodes, that is, if procedure S120 determines as "NO", procedure S140 is executed. For example, if node N1 receives a packet with address M21-M28, M31-M38, M41-M48 or M51-M58, it means that the packet is generated from other nodes.

Figure 1C:
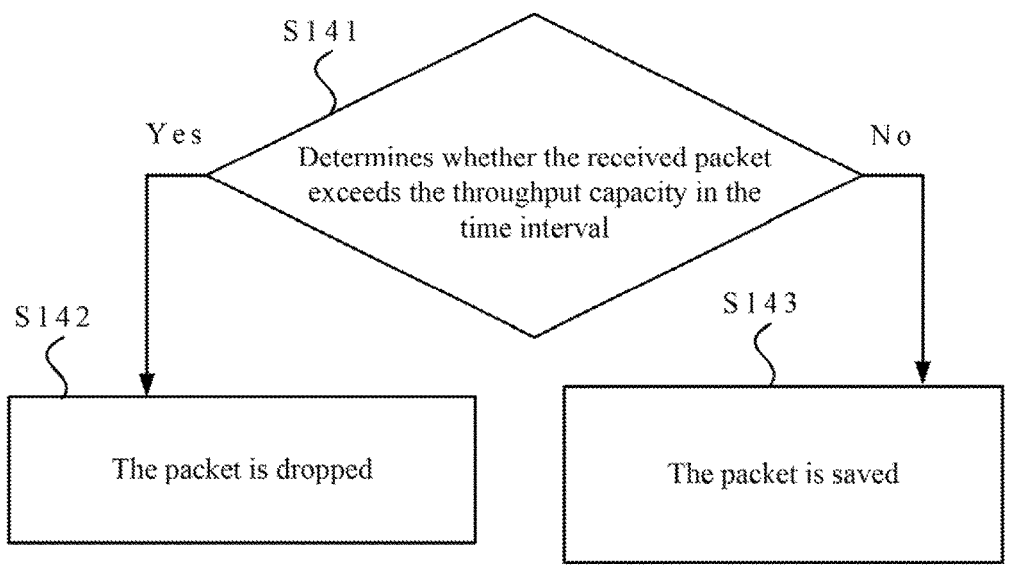
FIG. 1C is a flow diagram illustrating a control method according to FIG. 1A.

About procedure S140, reference is made to FIG. 1C. FIG. 1C is a flow diagram illustrating a control method 100 according to FIG. 1A. In the embodiment, procedure S140 further comprises procedure S141: determining whether the received packet exceeds the throughput capacity in the time interval, procedure S142: if the throughput of the received packet exceeds the throughput capacity, then the packet is dropped and procedure S143: if the throughput of the received packet does not exceed the throughput capacity, then the packet is saved.

Furthermore, to avoid the same packet to be repeatedly received and dealt with by nodes N1-N5, procedure S141 determines whether the throughput of the received packet exceeds the throughput capacity in the time interval.

Assume node N1 receives the fifth packet P45 generated by node N4, the address of packet P45 is M45. Node N1 deals with packet P45 according to access control list table Table 1. When node N1 is dealing with packet P45 generated by other nodes, if the throughput of packet P45 received by node N1 in the time interval 1 ms exceeds 128 bytes, then the packet is dropped, as shown in Table 1. On the other hand, if the throughput of packet P45 received by node N1 in the time interval 1 ms does not exceed 128 bytes, for example, the throughput of packet P45 received by node N1 in the time interval 1 ms is only 128 bytes, then packet P45 is saved by node N1.

In the embodiment, the standardized size of unit packet P11-P58 is 128 bytes, when node N1 received the packet P45 by the first time in the time interval 1 ms, the accumulated throughput of packet P45 does not exceed 128 bytes, so node N1 executes procedure S143 and packet P45 is saved. If node N1 receives packet P45 again in the same time interval, the accumulated throughput of packet P45 exceeds 128 bytes, so node N1 executes procedure S142 and packet P45 is dropped.

On the other hand, assume node N2 receives the fifth packet P45 generated by node N4, and the address of packet P45 is M45. Node N2 deal with the packet P45 according to the access control list table Table 2. When node N2 is dealing with packet P45 generated by the other nodes, if the throughput of packet P45 received by node N2 in the time interval 1 ms exceeds 128 bytes, then the packet is dropped, as shown in Table 2. Conversely, if the throughput of packet P45 received by node N2 in the time interval 1 ms does not exceed 128 bytes, for example, the throughput of packet P45 received by node N in the time interval 1 ms is only 32 bytes, then packet P45 is saved by node N2.

When node N2 received the packet P45 by the first time in the time interval 1 ms, the accumulated throughput of packet P45 does not exceed 128 bytes, so node N2 executes procedure S143 and packet P45 is saved. If node N2 receives packet P45 again in the same time interval, the accumulated throughput of packet P45 exceeds 128 bytes, so node N2 executes procedure S142 and packet P45 is dropped In some of the embodiments, if the packet from the same node reaches the throughput capacity threshold, the following packets received would be dropped. In part of the embodiments, the aforementioned throughput capacity threshold can set to be arbitrary between 128 bytes-256 bytes, that is, the throughput capacity threshold can set to be one to two times of the size of a unit packet. When the standardized size of unit packet P11-P58 is set to be 128 bytes, the throughput capacity threshold can set to be 128 bytes-256 bytes. On the other hand, when the standardized size of unit packet P11-P58 is set to be 512 bytes, the throughput capacity threshold can set to be 512 bytes-1024 bytes, and so on.

That is to say, node N1 would drop the packets P11-P18 generated by node N1 itself; node N2 would drop the packets P21-P28 generated by node N2 itself. For example, when node N1 receives the packets P21-P28 generated by node N2, node N1 would save the received packets. And then, if node N1 receives the packets of the same address P21-P28, node N1 would drop the received packets. That is, node N1 determines whether in a given time interval (e.g. time interval of 1 ms in the embodiment) the throughput capacity of the packets P21-P28 transmitted from the same address (that is, node N2) that N1 receives is too big. If the throughput capacity is too big (e.g. throughput exceeds 128 bytes), it means that similar packets of duplicate address are received. In this embodiment, node N1 can drop the packets that transmitted from node N2 with duplicate address to save the network bandwidths and resources. Similarly, node N2 would throw the packets P21-P28 generated by node N2 itself. Moreover, if node N2 receives the packets generated from other nodes the first time, node N2 would save the packets. For example, if node N2 receives packet P51-P58 generated by node N5 by the first time, node N2 would save the received packets. And if node N2 receives packets P51-P58 that transmitted from the same address, node N2 would drop the received packets.

In some of the embodiments, each of the nodes N1-N5 comprises a timer (which is not illustrated), when procedure S141 is executed by node N1-N5, that is, the packets generated by other nodes are received, the timer is triggered to calculate whether the time interval is reached. If the calculated time reaches the time interval, then reset the accumulated throughput of the received packets' address. If the calculated time does not reach the time interval, and the accumulated throughput of the received packets' address exceeds the throughput capacity threshold, then the subsequent packets received are dropped.

In other embodiments, no matter the packets transmitted by the other nodes are received or not, node N1-N5 would continuously trigger the timer to calculate whether the time interval is reached or not. If the time interval is reached, then accumulated throughput of all of the packets' address are reset, and the timer would restart again.

Thereby, the disclosure determines the origin of each received packets by nodes, and further decides whether drop the packets or not to decrease the opportunities of duplicate receiving or dealing with the same packet, which reduce the waste of bandwidth and save the use of arithmetic unit resources.

The aforementioned embodiments comprise a sequential step demonstration, but it is not limited to execute the procedure as the aforementioned sequence. The disclosure comprises executing the procedures in different sequences.

In summary, the disclosure distinguishes the origins of the received packets, and further determines whether to drop the packet or not to reduce the opportunities of duplicate receiving or dealing with the same packet, which reduce the waste of bandwidth and save the use of arithmetic unit resources.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A control method, suitable for a network structure comprising a plurality of nodes, and the nodes being coupled with each other, the control method comprising:
   receiving at least one packet by one of the nodes;
   determining by the one of the nodes whether the received at least one packet is originally transmitted from the one of the nodes itself or from other nodes;
   dropping the received at least one packet if the received at least one packet is originally transmitted from the one of the nodes itself; and
   selectively saving the received at least one packet according to a throughput capacity and a time interval if the received at least one packet is originally transmitted from the other nodes.

2. The control method of claim 1, wherein selectively saving the received at least one packet according to the throughput capacity and the time interval further comprising:
   determining whether a throughput of the received at least one packet accumulated during the time interval exceeds the throughput capacity or not;
   dropping the received at least one packet if the throughput of the received at least one packet during the time interval exceeds the throughput capacity; and
   saving the received at least one packet if the throughput of the received at least one packet during the time interval does not exceed the throughput capacity.

3. The control method of claim 2, wherein each of the plurality of nodes comprises a timer, the control method further comprising:
   triggering the timer when receiving the at least one packet; and
   counting by the timer whether the time interval is expired or not, and resetting the throughput accumulated corresponding to an address of the received at least one packet if the time interval is expired.

4. The control method of claim 2, wherein each of the nodes comprises a timer, the control method further comprising:
continuously triggering the timer to count whether the time interval is expired or not, and resetting all throughputs accumulated corresponding to all addresses of the received at least one packet if the time interval is expired.

5. The control method of claim 1, wherein the at least one packet is a control packet, a message packet or a data packet.

6. The control method of claim 1, wherein the throughput capacity is one to two times a size of a unit packet.

7. The control method of claim 1, wherein an address of the at least one packet comprises an IP address or a MAC address.

8. A network structure, comprising:
a plurality of nodes, each of the nodes being directly or indirectly electrically coupled with other nodes,
wherein one of the nodes receives at least one packet, the one of the nodes determines whether the received at least one packet is originally transmitted from the one of the nodes itself or from other nodes,
if the received at least one packet is originally transmitted from the one of the nodes itself, the one of the nodes drops the received at least one packet, and
if the received at least one packet is originally transmitted from the other nodes, the one of the nodes selectively saves the at least one packet according to a throughput capacity and a time interval.

9. The network structure of claim 8, wherein one of the nodes determines whether a throughput of the received at least one packet exceeds the throughput capacity, and if the throughput of the received at least one packet exceeds the throughput capacity, the one of the nodes drops the received at least one packet; if the throughput of the received at least one packet does not exceed the throughput capacity, the one of the nodes saves the received at least one packet.

10. The network structure of claim 9, wherein each of the nodes comprises a timer, when one of the nodes receives the at least one packet, the timer is triggered to count whether the time interval is expired or not, the one of the nodes resets the throughput accumulated corresponding to an address of the received at least one packet if the time interval is expired.

11. The network structure of claim 9, wherein each of the plurality of nodes comprises a timer, one of the nodes continuously triggers the timer to count whether the time interval is expired or not, the one of the nodes resets all throughputs accumulated corresponding to all addresses of the received at least one packet if the time interval is expired.

12. The network structure of claim 8, wherein the at least one packet comprises a control packet, a message packet or a data packet.

* * * * *